April 15, 1952 W. J. COULTAS ET AL 2,592,866
IMPLEMENT DRAFT CONNECTION
Filed Nov. 9, 1946 3 Sheets-Sheet 1

INVENTORS
WILBUR J. COULTAS
RUSSELL L. DORT
BY
ATTORNEYS

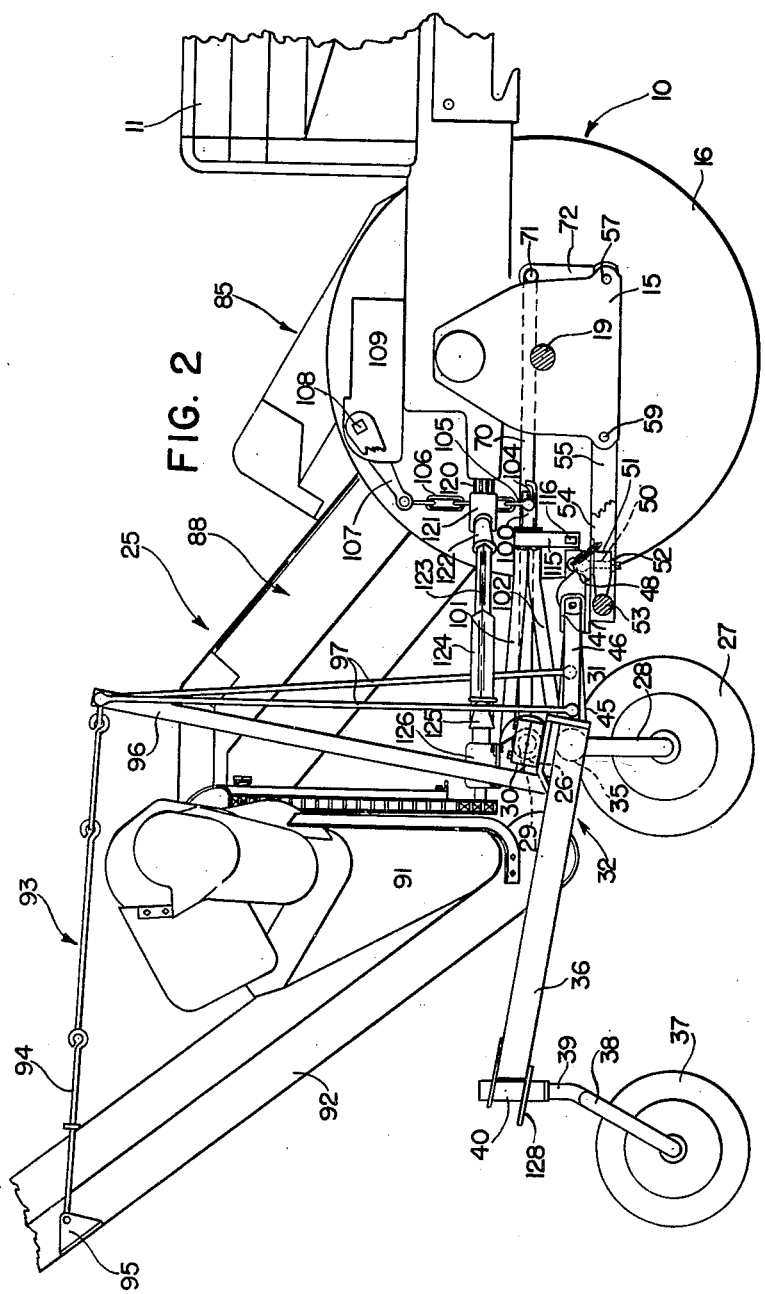

April 15, 1952   W. J. COULTAS ET AL   2,592,866
IMPLEMENT DRAFT CONNECTION
Filed Nov. 9, 1946   3 Sheets-Sheet 3
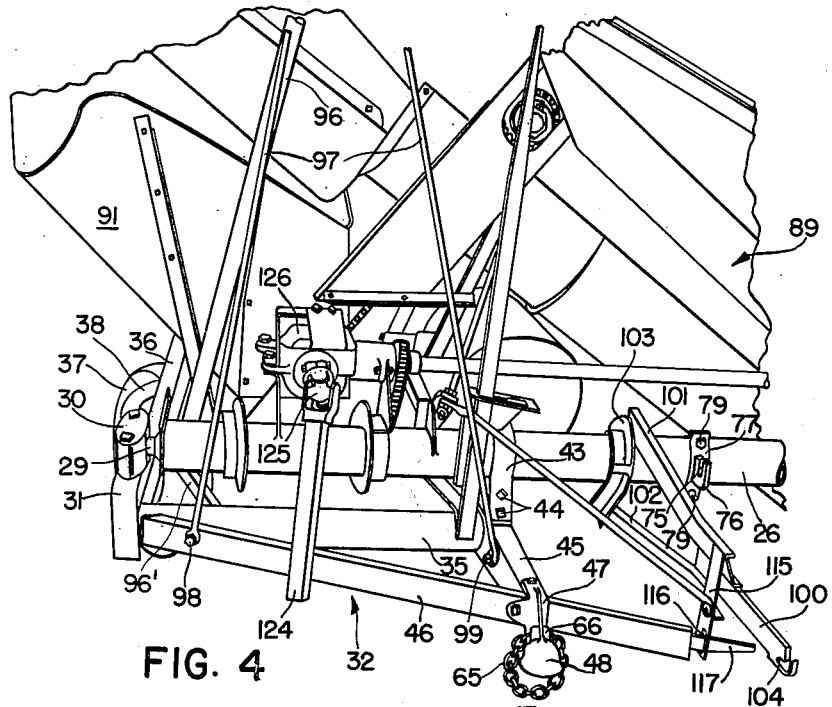
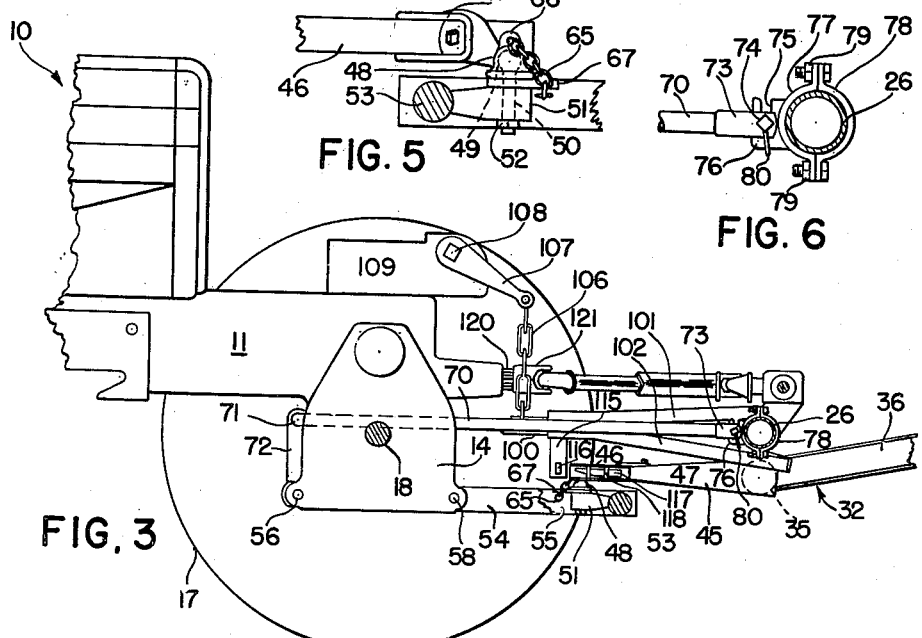
INVENTORS
WILBUR J. COULTAS
RUSSELL L. DORT
BY
ATTORNEYS Patented Apr. 15, 1952

2,592,866

UNITED STATES PATENT OFFICE 2,592,866

IMPLEMENT DRAFT CONNECTION

Wilbur J. Coultas, Moline, Ill., and Russell L. Dort, Davenport, Iowa, assignors to Deere & Company, Moline, Ill., a corporation of Illinois Application November 9, 1946, Serial No. 708,962

11 Claims. (Cl. 56—18)

The present invention relates generally to agricultural implements and more particularly to implement draft connections and has for its principal object the provison of novel and improved means for mounting an implement on a tractor or other draft device.

In our Patent No. 2,337,592 granted December 28, 1943, we have disclosed a novel corn harvester of the semi-mounted type, that is to say, the harvester is carried on the rear end of a tractor and extends laterally to a gatherer unit extending alongside the tractor body, but a portion of the weight of the implement is carried on an outboard supporting wheel, while the draft connections permit a vertical floating movement of the implement relative to the tractor during operation in the field.

Heretofore, this type of implement has been designed for and applied to the general purpose type of tractor having rear traction wheels which can be set at a comparatively wide spacing, the dimensions of the harvester being such that the gatherer unit extends forwardly immediately adjacent the outer side of one of the rear traction wheels, while the inner end of the implement frame is mounted on the tractor drawbar between the wheels.

It has been recognized that some smaller tractors have sufficient power capacity to operate a corn picker of this type, but the narrower spacing between the rear wheels of such tractors prevents the use of the same mounting means shown in our patent, for the gatherer unit would extend laterally to such an extent that an excessive side draft would be imposed upon the tractor. Furthermore, the weight of the mounted end of the implement is greater than can be carried upon the draw bar of small tractors without raising the front wheels off the ground.

It is therefore a further object of our invention to provide mounting means by which a corn picker of this type can be mounted on a small tractor while retaining, for the most part, the operating advantages of the larger tractor.

In the accomplishment of this object, we have provided a longitudinally extending supporting truck for the inner end of the harvesting implement comprising a frame supported at its forward end on the tractor drawbar and at its rearward end on a caster wheel and providing a socket for supporting the inner end of the main transverse frame beam of the implement. This permits the implement to be positioned behind the tractor with the gatherer unit extending forwardly immediately outside the plane of the rear traction wheel, while the greater portion of the weight of the implement is supported on the separate ground wheels to relieve weight from the tractor drawbar. The ball and socket joint between the transverse frame beam and the truck frame provides for vertically adjusting the gatherer unit during operation, as in the implement arrangement shown in our patent.

Another object relates to the provision of a power connection between the power lift arm of the tractor and the main transverse beam of the implement, by means of which the beam can be rocked by the hydraulic power control mounted on the tractor to raise and lower the forward end of the gatherer unit.

Still another object relates to the provision of means for locking the gatherer relative to the truck frame to provide a unitary rigid structure which will be stable when dismounted from the tractor and supported upon the two ground wheels and the gatherer frame, thereby contributing to the ease of mounting and dismounting the implement relative to the tractor.

These and other objects and advantages of our invention will be apparent to those skilled in the art after a consideration of the following description, in which reference is had to the drawings appended hereto, in which Figure 1 is a top plan view of a tractor and semi-mounted implement embodying the principles of our invention, portions of the tractor and implement being broken away to conserve space;

Figure 2 is a side elevational view of the portions of the tractor and implement shown in Figure 1, with the near traction wheel removed and portions of the mechanism broken away to more clearly illustrate the construction;

Figure 3 is a sectional elevational view taken substantially along a line 3—3 in Figure 1 with the near tractor wheel removed and with a portion broken away to expose the details of the mechanism;

Figure 4 is a perspective view looking at the front central portion of the implement showing the draft connections, with the implement removed from the tractor;

Figure 5 is a side elevational view, drawn to an enlarged scale, of the quickly detachable draft connection between the truck frame and the tractor; and Figure 6 is an enlarged side elevational view of the quickly detachable connection between the draft link and the main transverse frame beam.

Figure 1:
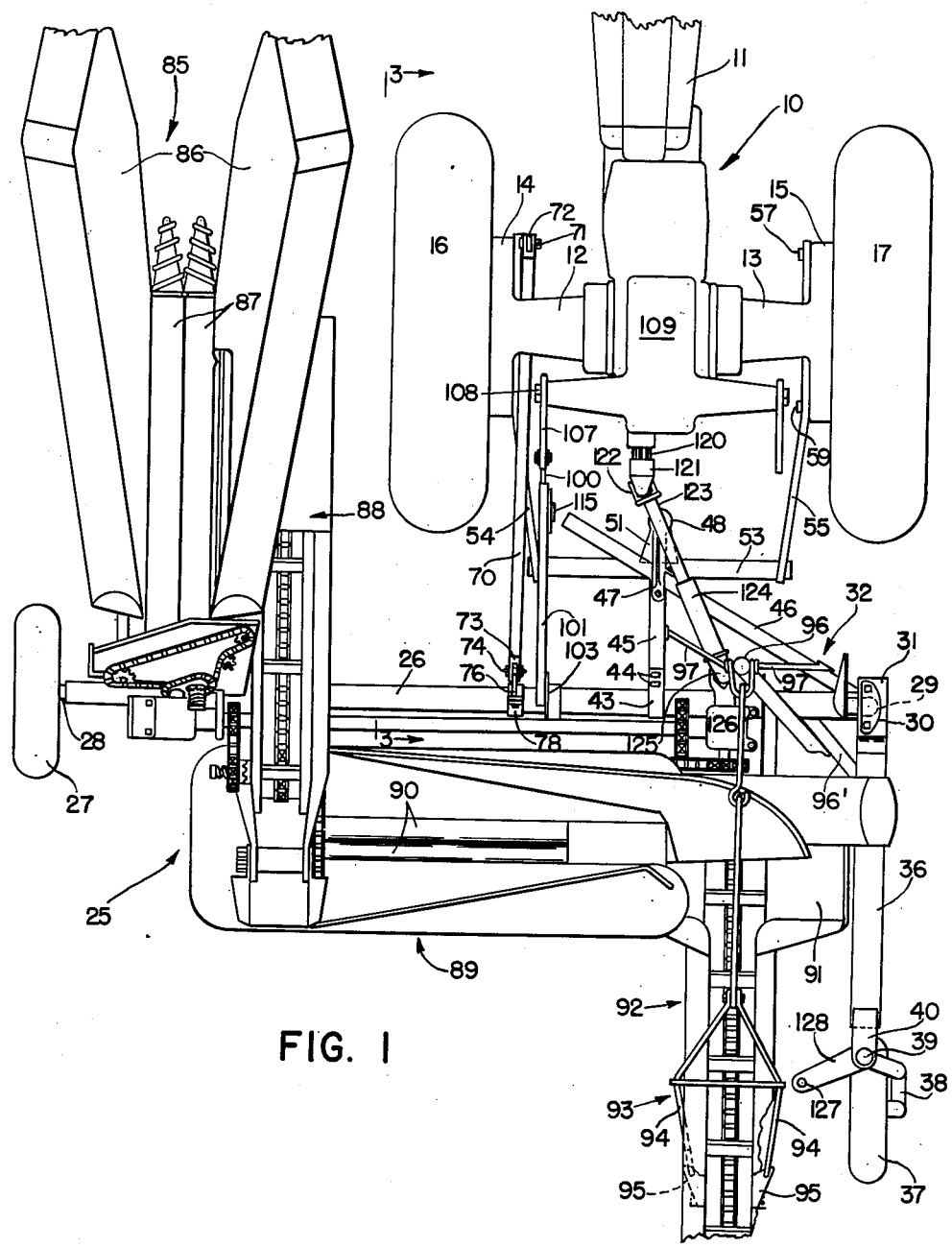

Referring now to the drawings, the tractor is indicated in its entirety by reference numeral 10 and comprises a narrow longitudinally extending body 11 carried at its forward end upon a dirigible wheeled truck (not shown) and at its rear end on a pair of laterally oppositely extending housings 12, 13, the outer ends of which carry depending final drive housings 14, 15, respectively. A pair of wheels 16, 17 are mounted on axles 18, 19, respectively, through which power is transmitted for driving the tractor in a conventional manner.

The corn harvesting implement 25 need not be described herein in great detail, for reference can be made to our above mentioned Patent 2,337,592 for a complete description thereof. The frame of the implement comprises essentially a main frame comprising a transversely disposed tubular beam 26 disposed behind the tractor and carried at its outer end on a fixed-direction, ground engaging wheel 27 which is journaled on the lower end of a depending axle arm 28.

The inner end of the tubular beam 26 is connected by means providing a bearing including cooperating ball and socket joint members 29, 30 to a bracket 31 which is rigidly mounted on a supporting truck 32.

The supporting truck 32 comprises a tubular frame member 35 disposed transversely behind the tractor and directly beneath the inner end of the implement beam 26. One end of the frame member 35 is rigidly fixed to a rearwardly extending truck frame member 36, the rear end of which is supported on a caster wheel 37, which is journaled on a castering axle arm 38 having a vertical spindle 39 which is journaled in a vertical sleeve 40, rigidly mounted on the rear end of the rearwardly extending frame member 35.

The opposite end of the tubular frame member 35 is rigidly fixed to a forwardly extending frame member 45, the forward end of which is rigidly connected to a laterally and rearwardly inclined bracing member 46, by means of a bracket casting 47, which is securely bolted to the two intersecting frame members 45, 46. The member 45 is connected to the beam 26 by a strap 43 bolted at 44 to and passing over the beam 26 and providing for rocking movement of the beam relative to the truck 32.

A bell shaped spherical socket member 48 is cast integrally with the bracket 47 and projects forwardly and downwardly therefrom. A cooperative ball joint member 49 is supported on a vertical spindle 50, which is mounted on a connecting plate 51 carried by the tractor. The lower end of the spindle 50 is threaded to receive a securing nut 52 which rigidly fixes the spindle 50 and ball 49 to the plate 51. The plate 51 is rigidly fixed, as by welding, to a transversely disposed drawbar 53, which is fixed at opposite ends thereof, respectively, to a pair of arms 54, 55, the latter being pivotally mounted on a pair of pivot bolts 56, 57 which are mounted in coaxial relation on the depending axle housings 14, 15, respectively, thus providing for vertical swinging movement about the transversely extending axis of the bolts 56, 57. During operation, however, the vertically swingable drawbar supporting arms 54, 55 are rigidly fixed by bolts 58, 59 to the rear portions of the depending axle housings 14, 15, respectively.

Normally, the weight of the implement tends to hold the socket member 48 down on the ball 49, the draft force of the tractor being transmitted therethrough to the supporting truck 32, but to prevent disengagement of the ball and socket members, a retainer 65 is provided in the form of a bail comprising a flexible chain which is secured to a lug 66 on top of the socket 48. During normal operation, the flexible bail 65 hangs under a forwardly projecting tongue 67, which is rigidly secured to the supporting plate 51 and thus prevents the socket member 48 from lifting off the ball 49. Although the bail 65 could be a rigid loop pivoted to the lug 66, we have found that a flexible chain has less tendency to swing forwardly out of engagement with the tongue 67 during operation. However, the flexible bail 65 is quickly and easily swung out from under the tongue 67 by the operator when dismounting the implement from the tractor, as will be explained later.

A second draft connection is provided between the tractor and the transverse beam 26 and comprises a draft link 70, which is pivotally connected by means of a pivot pin 71 to an upstanding arm 72 fixed to the forward end of the drawbar supporting arm 54. The link 70 extends rearwardly beneath the tractor axle housing 12 and is swingably connected at its rear end to the beam 26 by means of a readily detachable connection, shown in Figure 6, comprising a bifurcated connector 73 which carries a transverse bolt 74 adapted to drop into a downwardly extending slot 75 in an ear element 76. The ear 76 is fixed, as by welding, to a semi-circular bracket plate 77, the latter embracing the forward half of the circumference of the tubular beam 26 and secured thereto by means of a complementary semicircular bracket member 78 having radial flanges secured by bolts 79 to flanges on the forward bracket 77 to clamp the two brackets 77, 78 tightly on the tubular beam 26. A retainer 80 is provided to hold the connector 73 in engagement with the ear 76 and comprises a depending bail swingably carried on the bolt 74 on opposite sides of the connector 73, and depending downwardly under the ear 76. The bail 80 can be swung forwardly about the axis of the bolt 74 to clear the bottom of the ear 76, to permit the link 70 to be raised to disengage the bolt 74 from the slot 75. In this detachable connector, the retainer 80 is preferably a solid loop made of heavy wire or the like, for it is considerably smaller and lighter than the retainer 65 and we have found that a solid loop does not swing out of engagement with the ear 76.

Briefly, the operating portions of the implement itself comprise a snapping or gathering unit 85, which is rigidly mounted on the outer end of the tubular beam 26 and extends rigidly forwardly therefrom alongside the tractor wheel 16 and body 11. The snapping unit comprises a pair of gatherer arms 86 spaced apart laterally to receive therebetween the stalks of corn in a row, and between the arms 86 are disposed snapping rolls 87 of more or less conventional construction. The ears of corn which are snapped from the stalks by the rolls 87 drop laterally into an ear conveyor 88 which extends rearwardly alongside the inner gatherer and deposits the ears into a husking box 89, which is disposed substantially parallel to the tubular beam 26 and is supported therefrom. The husking box 89 contains a pair of transversely disposed husking rolls 90 which remove the husks from the ears and the ears are delivered to a hopper 91 mounted over the lower end of an upwardly and rearwardly inclined wagon elevator 92, which is also mounted on the transverse beam 26 and is provided with a suspension linkage 93 comprising a pair of laterally spaced rods 94 connected to stirrups 95 under the elevator 92 near the central portion thereof. The linkage 93 extends forwardly over the husking box and is connected to a vertically extending mast 96, which is mounted on a diagonal truck frame member 96' and is provided with a pair of downwardly diverging brace rods 97 connected by bolts 98, 99 to the truck frame members 46, 45, respectively.

The gatherers 86 can be raised and lowered together with the forward ends of the snapping rolls 87 by rocking the transverse beam 26 about its major axis. The inner end of the beam 26 rocks relative to the truck frame by virtue of the ball and socket joint 29, 30, while the outer end of the beam 26 is carried on the wheel arm 28, which rocks fore and aft during vertical adjustment of the snapping unit 85. The beam 26 is rocked by means of a lever 100, which is supported on a pair of upper and lower structural angle members 101, 102, which are rigidly secured to a collar or flange 103 fixed to the tubular beam 26. The lever 100 extends forwardly substantially horizontally from the beam 26 and has a horizontally disposed slot 104 at its forward end, which is adapted to receive a clevis 105 (see Figure 2). The clevis 105 is mounted on the lower end of a chain 106 which is connected to the outer end of a power lift arm 107 mounted on one end of a power lift rockshaft 108, which is disposed within a housing 109 containing hydraulic power lift mechanism of any suitable type, by which the rockshaft 108 can be adjusted angularly about its transverse axis to raise and lower the arm 107, thereby pulling upwardly on the lever 100 to rock the tubular beam 26.

Before dismounting the implement 25 from the tractor 10, it is desirable to secure the gathering unit 85 and the supporting truck 32 together in a unitary rigid structure in order that the implement will be stable when resting upon the two wheels 27, 37 and the forward ends of the gatherers 86. This is accomplished by locking the forward end of the truck frame member 46 to the forward end of the lifting arm 100. To this end, the lifting arm 100 is provided with a downwardly extending bracket plate 115 having an aperture 116 near its lower end and disposed in register with the end of the bracing member 46, which is a channel and which is extended beyond the bracket 47 into close proximity with the apertured plate 115. A locking bar 117 is slidably retained within the member 46 by a pair of brackets or straps 118 for projection through the aperture 116 to lock the member 46 to the plate 115. This has the effect of locking the tubular beam 26 relative to the truck 32, which must be accomplished before the implement is ready for dismounting from the tractor. The draft link 70 is then disconnected from the ear 76 by swinging the retainer loop 80 forwardly against the link 70, which is then raised to unhook the bolt 74 from the slot 75. The retainer chain 65 is then swung forwardly out of engagement with the tongue 67 to release the ball and socket draft connection, after which the power lift mechanism is actuated to raise the arm 100 and hence the truck frame member 46 to lift the socket member 48 up out of engagement with the ball 49 on the drawbar. The tractor can then be moved forwardly and the power lift arm 107 lowered to lower the implement until the gatherers 86 rest upon the ground. The clevis 105 is then disengaged from the slot 104 in the arm 100 and the tractor is then free to move away from the implement. Obviously, it is desirable to remove the link 70 from the tractor by removing the pivot pin 71 to disconnect the link 70 from the depending axle housing 14.

Power is transmitted from the tractor engine to the implement to drive the snapping and husking rolls 87, 90 and the other part of the equipment. For this purpose, the tractor is provided with a rearwardly extending splined power take-off shaft 120, on which is mounted a detachable splined sleeve 121 connected through a universal joint 122 to a square shaft 123. The shaft 123 is adapted to telescope into a hollow shaft 124 of square cross section, which is connected through a universal joint 125 to gear mechanism (not shown) within a gear box 126, from which suitable power connections are made to the various parts of the implement. However, inasmuch as these are fully described in our above mentioned patent, a description here is not considered necessary. The telescoping shaft sections 123, 124 are readily separable when the tractor moves away from the implement.

The implement is quickly mounted on the tractor by backing the latter up to the implement and connecting the power lift clevis 105 to the slot 104 in the forward end of the lever 100, then lifting the power lift arm 107 to raise the socket member 48 above the ball 49, after which the socket is lowered into engagement with the ball and the retainer chain is allowed to swing under the tongue 67. The link 70 is connected by the pin 71 to the arm 72, and is hooked into the slot 75 with the retainer 80 swung back under the link 70, after which the retainer 80 is allowed to depend underneath the ear 76 to hold the link 70 in engagement with the ear. The power shaft connections are made, and then the locking bar 117 is shifted out of the aperture 116 and the corn picker is ready for operation. By virtue of the two laterally spaced draft connections between the tractor and the implement, the implement moves with the tractor but is free to float vertically over uneven ground relative to the tractor. The snapping rolls 87 harvest the ears from a single row of corn, husking the ears and then delivering them rearwardly by the elevator 92 into a wagon (not shown), the tongue of which can be pivotally connected to an aperture 127 in a draft arm 128 fixed to the rear end of the truck frame member 36.

We claim:

1. An agricultural implement frame structure, comprising a transversely disposed main frame, a supporting wheel journaled at one end of said frame, a rigid truck frame extending generally fore and aft at the other end of said main frame, a caster wheel mounted at the rear of said truck frame for supporting the latter, means supporting said other end of said main frame on said truck frame providing for rocking movement of the main frame relative to the truck frame about an axis transverse to the truck frame and lengthwise as respects the main frame, detachable means for mounting the forward end of the truck frame on a tractor or the like for supporting said truck frame and transmitting draft force thereto, and a draft link having means pivotally connecting the same between said main frame and such tractor or the like at points spaced laterally from said truck frame connection and providing for vertical swinging movement of said link.

2. An agricultural implement frame structure, comprising a transversely disposed main beam, a supporting wheel mounted at one end of said beam, a rigid truck frame extending generally fore and aft at the other end of said beam, a caster wheel mounted at the rear of said truck frame for supporting the latter, a bearing on said truck frame for rockably supporting said other end of said beam and providing for rocking movement of the latter about its major axis, detachable means at the forward end of said truck frame for supporting the latter on a tractor or the like, a draft link spaced laterally from said detachable means for swingably connecting said beam to such tractor or the like, and means for rocking said beam relative to said truck frame.

3. An agricultural implement frame structure, comprising a transversely disposed main frame, a supporting wheel journaled at one end of said frame, a rigid truck frame extending generally fore and aft at the other end of said main frame, a caster wheel mounted at the rear of said truck frame for supporting the latter, means supporting said other end of said main frame on said truck frame providing for rocking movement of the main frame relative to the truck frame about an axis transverse to the truck frame and lengthwise as respects the main frame, detachable means for mounting the forward end of said truck frame on a tractor or the like for supporting said truck frame and transmitting draft force thereto, means for locking said frames together into a rigid structure to facilitate dismounting of the frames from the tractor, and a draft link having means for pivotally connecting the same between said main frame and such tractor or the like at points spaced laterally from said truck frame connection and providing for vertical swinging movement of said link.

4. An agricultural implement frame structure, comprising a transversely disposed main beam, a supporting wheel mounted at one end of said beam, a rigid truck frame extending generally fore and aft at the other end of said beam, a caster wheel mounted at the rear of said truck frame for supporting the latter, a bearing on said truck frame for rockably supporting said other end of said beam and providing for rocking movement of the latter about its major axis, detachable means at the forward end of said truck frame for supporting the latter on a tractor, and means for optionally locking said beam relative to said frame to form a rigid structure, said locking means comprising an arm fixed to said beam and having an apertured element thereon, a frame member serving as part of said truck frame and extending toward said arm, and a bar slidably mounted on said member and shiftable into engagement with said apertured part.

5. An implement supporting truck comprising a longitudinally extending frame constructed for disposition behind a tractor, means for mounting the forward end of said frame on such tractor, a caster wheel mounted on the rear end of said frame for supporting the frame from the ground, a main transverse beam rockably mounted on said frame and providing for rocking movement of the beam substantially about its major axis, said beam extending laterally from said frame to provide a portion positionable beyond one side of such tractor, a wheel mounted adjacent said end portion of said beam, an implement part mounted on said portion of said beam for disposition outwardly of and extending substantially parallel to such tractor, and means for rocking said beam to raise and lower said implement part.

6. An implement supporting truck comprising a longitudinally extending frame constructed for disposition behind a tractor, means for mounting the forward end of said frame on such tractor, a caster wheel mounted on the rear end of said frame for supporting the frame from the ground, a main transverse beam having one end portion rockably mounted on said frame and providing for rocking of the beam substantially about its major axis, said beam extending laterally from said frame to provide a second end portion positionable beyond one side of such tractor, a wheel mounted adjacent said second end portion of the beam, an implement part mounted on said second end portion of the beam for disposition outwardly of and extending substantially parallel to such tractor, a draft link for swingably connecting said beam and such tractor at points spaced laterally from said rockable mounting and said forward truck frame mounting, and means for rocking said beam to raise and lower said implement part.

7. An implement supporting truck comprising a longitudinally extending frame constructed for disposition behind a tractor, means for mounting the forward end of said frame on such tractor, a caster wheel mounted on the rear end of said frame for supporting the frame from the ground, a main transverse beam rockably mounted on said frame and providing for rocking movement of the beam substantially about its major axis, said beam extending laterally from said frame to provide a portion positionable beyond the side of such tractor, a wheel mounted adjacent said portion of the beam, an implement part mounted on said portion of the beam for disposition outwardly of and extending substantially parallel to such tractor, means for rocking said beam to raise and lower said implement part, and means for locking said beam against movement relative to said frame to provide a rigid structure which, when dismounted from such tractor, is stable when resting upon said wheels and said implement part.

8. For use with a tractor having power lift mechanism including a power-actuated arm: an implement supporting truck comprising a longitudinally extending frame constructed for disposition behind such tractor, means for mounting the forward end of said frame on such tractor, a caster wheel mounted on the rear end of said frame for supporting the same on the ground, a main transverse beam rockably mounted on said frame providing for rocking movement of the beam substantially about its major axis, said beam having a portion positionable to extend laterally from said frame beyond the side of such tractor, a wheel mounted adjacent said portion of the beam, an implement part mounted on said portion of the beam for disposition outwardly of and extending substantially parallel to such tractor, an arm fixed to the beam and extending forwardly therefrom for rocking said beam to raise and lower said implement part, and link means for connecting said arm to the power-actuated arm on the tractor.

9. For use with a tractor having power lift mechanism including a power-actuated arm: an implement supporting truck comprising a longitudinally extending frame disposed behind said tractor, means for mounting the forward end of said frame on such tractor, a caster wheel mounted for supporting the rear end of said frame, a main transverse beam rockably mounted on said frame and providing for rocking movement of the beam substantially about its major axis, said beam having a portion positionable to extend laterally from the longitudinal frame and beyond the side of such tractor, a wheel mounted adjacent said portion of the beam, an implement part mounted on said portion of the beam for disposition outwardly of and extending substantially parallel to such tractor, means for rocking the beam to raise and lower said implement part comprising an arm fixed to said beam and extending forwardly therefrom, link means for connecting said arm to the power-actuated arm on the tractor, and means comprising a locking bar engageable between said beam arm and said truck frame for locking said beam and frame to provide a rigid structure, which, when dismounted from said tractor, is stable when resting upon said wheels and said implement part.

10. An implement supporting truck, comprising: a longitudinal frame constructed for disposition lengthwise as respects a tractor and having opposite ends; means at one of said ends for connecting the frame to and sustaining the frame on such tractor; ground-engaging wheel means at and for sustaining the other end of the frame; a transverse member having opposite ends, one proximate to and the other remote from the frame; second ground-engaging wheel means sustaining the remote end of the member; means including a bearing on a transverse axis sustaining the proximate end of the member on the frame, whereby said member is rockable relative to the frame about said bearing and the second wheel means; third ground-engaging means connected to the transverse member in transversely spaced relation to the frame for limiting ground-ward rocking of said member; a longitudinal support element rigidly secured to the transverse member adjacent the frame; a diagonal support fixed to the frame and extending to cross the longitudinal support at a point spaced longitudinally from the transverse member; and selectively engageable and disengageable means at the crossing of the support elements for selectively interconnecting said elements to sustain the diagonal element on the longitudinal element and hence to rigidify the truck at the aforesaid bearing means.

11. A two-wheeled supporting truck for carrying an implement in association with a tractor having front wheel means and a pair of laterally spaced rear wheels, comprising an L-shaped frame made up of a longitudinal member and a transverse member secured together and positionable behind the tractor with the transverse member disposed crosswise of the tractor closely behind the tractor wheels and extending from a first end portion adjacent one rear wheel of the tractor to a second end portion laterally beyond the other rear wheel of the tractor, and with the longitudinal member extending longitudinally rearwardly from said first end portion of the transverse member to a rear end remote from the tractor rear wheels; a ground-engaging caster wheel at said rear end of the longitudinal member and substantially in longitudinally alined trailing relationship to said one rear wheel of the tractor to provide a first point of support for the L-shaped frame; a ground-engaging supporting wheel at said second end of the transverse member laterally outwardly of said other rear wheel of the tractor to provide a second point of support for the L-shaped frame; an implement-supporting part on the transverse member closely adjacent to said supporting wheel for carrying an implement to extend ahead of the transverse member and alongside said other rear wheel of the tractor; and means connected to the L-shaped frame and extending forwardly from the transverse member intermediate the supporting wheel and the junction of said longitudinal and transverse members for mounting the L-shaped frame on the tractor and providing a third point of support for said frame, said three points of support comprising the sole means for carrying said L-shaped frame.

WILBUR J. COULTAS.
RUSSELL L. DORT.

REFERENCES CITED

The following references are of record in the file of this patent:

UNITED STATES PATENTS

| Number | Name | Date |
|---|---|---|
| 1,118,236 | Roedel | Nov. 24, 1914 |
| 1,119,667 | Voller | Dec. 1, 1914 |
| 1,197,712 | Dain | Sept. 12, 1916 |
| 1,427,066 | Chaffee | Aug. 22, 1922 |
| 1,910,189 | Synck | May 23, 1933 |
| 1,979,908 | Schuller | Nov. 6, 1934 |
| 2,011,817 | Littlefield | Aug. 20, 1935 |
| 2,198,910 | Everett | Apr. 30, 1940 |
| 2,331,863 | Schroeppel | Oct. 12, 1943 |
| 2,335,942 | Hyman | Dec. 7, 1943 |
| 2,337,592 | Coultas et al. | Dec. 28, 1943 |
| 2,363,897 | Paradise et al. | Nov. 28, 1944 |